Figure 1:
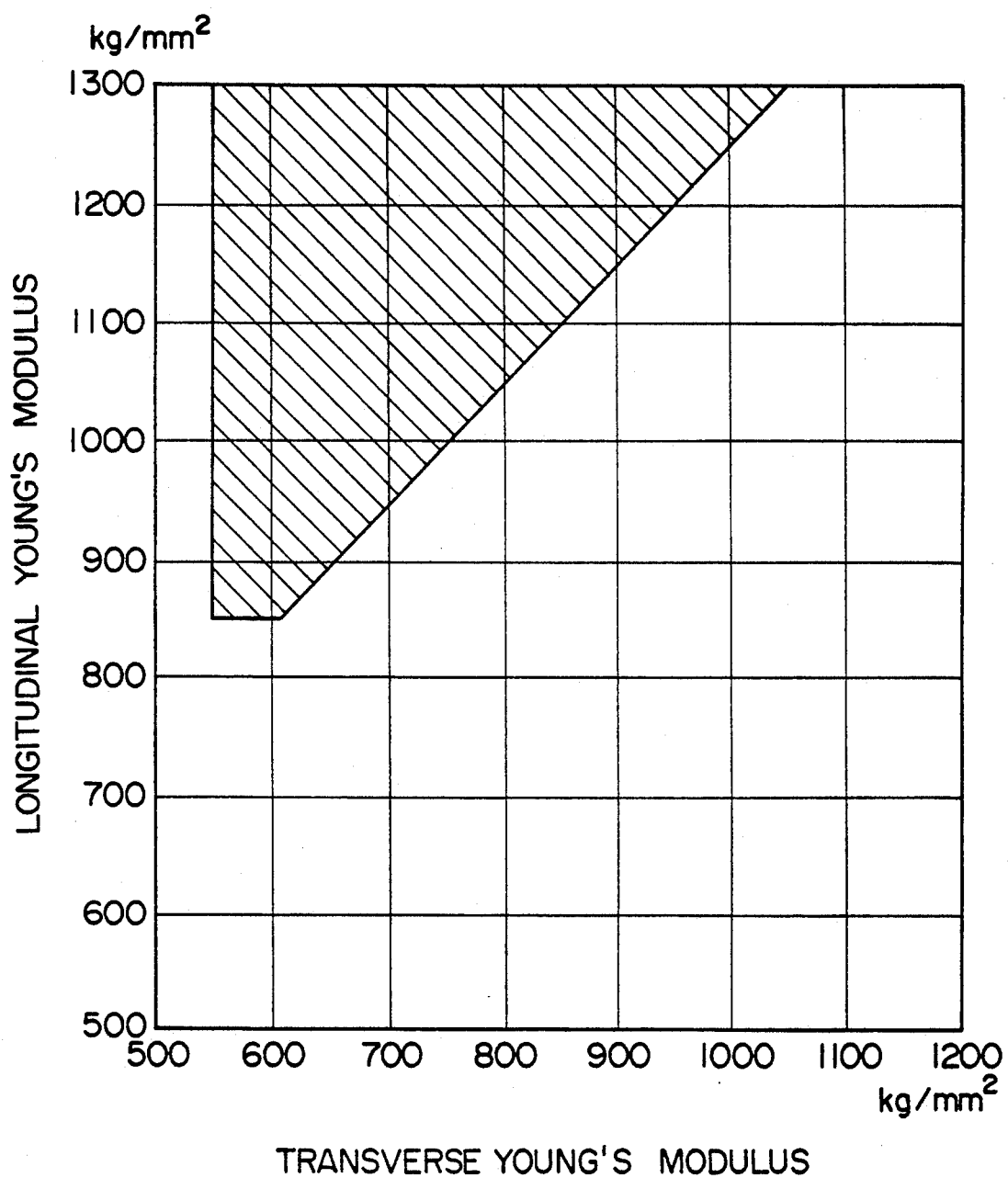

United States Patent
Etchu et al.

Patent Number: 5,316,823
Date of Patent: May 31, 1994

[54] MAGNETIC TAPE

[75] Inventors: Masami Etchu, Yokohama; Hisashi Hamano, Sagamihara; Masahiro Hosoi, Tokyo; Yasuhiro Saeki, Sagamihara, all of Japan

[73] Assignee: Teijin Limited, Osaka, Japan

[21] Appl. No.: 833,924

[22] Filed: Feb. 12, 1992

[30] Foreign Application Priority Data

Feb. 21, 1991 [JP] Japan ................. 3-047406

[51] Int. Cl.⁵ .................. G11B 5/66; B32B 27/06
[52] U.S. Cl. ..................... 428/141; 428/480; 428/694 ST; 428/694 SL; 428/694 SG; 428/900
[58] Field of Search ............... 428/141, 480, 694, 900, 428/694 B, 694 ST, 694 SL, 694 SG

[56] References Cited

U.S. PATENT DOCUMENTS

| | | | |
|---|---|---|---|
| 4,614,687 | 9/1986 | Nishimatsu et al. | 428/329 |
| 4,710,421 | 12/1987 | Ono et al. | 428/213 |
| 4,720,412 | 1/1988 | Katoh et al. | 428/141 |
| 4,780,353 | 11/1988 | Takahashi et al. | 428/141 |
| 4,804,736 | 2/1988 | Utsumi et al. | 528/176 |
| 5,051,292 | 9/1991 | Katoh et al. | 428/141 |

FOREIGN PATENT DOCUMENTS 0381213  8/1990  European Pat. Off.

OTHER PUBLICATIONS

Teijin, Patent Abstracts of Japan, vol. 11, No. 293 (P-619) (2740), 1987.

Primary Examiner—Paul J. Thibodeau
Assistant Examiner—Leszek Kiliman
Attorney, Agent, or Firm—Wenderoth, Lind & Ponack

[57] ABSTRACT

A magnetic tape for audio cassettes wherein a magnetic layer is provided on base film characterized in that the a base film, is biaxially oriented polyethylene-2,6-naphthalate film having a Young's modulus in the longitudinal direction of 850 Kg/mm² or more, a Young's modulus in the transverse direction of 550 Kg/mm² or more a surface roughness Ra in the range of 0.015 to 0.040 μm, and a thermal shrinkage rate in the longitudinal direction of 0.3% or less in a case where it was held at a temperature of 100° C. for 1 hour.

A magnetic tape for audio cassettes is provided which is capable of long-time recording and wherein deterioration of magnetic characteristics does not easily occur in use, storage and the like at a high temperature, for example in the open during summer or in cars, compared to conventional ones.

12 Claims, 1 Drawing Sheet

MAGNETIC TAPE

This invention relates to a magnetic tape for audio cassettes, and more detailedly to a magnetic tape for audio cassettes on which it is possible to make long-time recording and which has magnetic characteristics that do not easily deteriorate in use under a high temperature atmosphere, for example during use in the open or in cars.

Nowadays, audio cassette tapes for 60 minutes and 90 minutes on recording and reproduction time are generally used. In this connection, in special use areas where long-time recording and reproduction are, for example, necessary, cassette tapes capable of long-time recording are required and magnetic tapes for 120 minutes are partly sold on the market. However in practical use, various troubles tend to occur in the existing audio cassette tapes for 120 minutes. For example, in order to integrate tape into cassettes having the same standard as the usual one, it is necessary to make its thickness thinner for lengthening recording and reproduction time and also to make the film as its base material thinner. Making the film thinner makes it easier for various troubles to occur during use. Troubles include, for example, stretching and contraction during running of the tape and deformation of the tape due to tension change at the time of start and stop and the resulting distortion of recording, and further biased stretch at both sides of the tape, breaking and bending and, twining of the running tape on the guide. Thus, as the actual situation, hardware makers are sticking directions on their hardwares saying that use of the existing audio cassette tapes for 120 minutes should be restrained. Thus tape is desired wherein such troubles are obviated.

Further, audio cassette tape has recently come to be used even in the open during summer or in cars, and cases are increasing where it is used under environments more severe and higher in temperature compared to the usual cases. Thus audio cassette tape is desired which is excellent in heat resistance, etc. and does not change in tape characteristics even in more severe environmental change, for example-one which does not deteriorate in its characteristics even when left under an atmosphere of a high temperature such as, for example, 90° to 100° C. Further, when the tape is run at a high temperature and rolled around a reel or when it is rolled around a reel at ordinary temperature and stored or left at a high temperature, very much larger stress is applied to the tape by rolling and throttling strength compared to cases at ordinary temperature, and thereby there sometimes occur very large difference in tape characteristics between the part near the core and the roll surface layer part (the end part of the tape) of the tape reel. This is caused by pushing pressure applied to the surface of the base film from the facing magnetic surface due to the rolling and throttling strength and consequently the peakings of the base film surface are crushed and flattened. Such tendency is due to the fact that the rolling and throttling strength become larger in proportion as the surface of the base film becomes flat and toward the inner layer of the roll of the tape reel.

Japanese Laid-Open Patent Publication No. 88136/1987 discloses an audio cassette tape whose recording and reproduction time is 120 minutes to 180 minutes and wherein a biaxially oriented polyethylene-2,6-naphthalenedicarboxylate film is used as a base film which has a thickness of 3 μm to 7 μm and a Young's modulus in the longitudinal direction of 800 Kg/mm², satisfies a prescribed relational expression between the refractive index $\eta x$ in the thickness direction and the Young's modulus $Y_{MD}$ in the longitudinal direction, and has a film surface roughness Ra in the range of 0.012 μm to 0.040 μm.

Further, U.S. Pat. No. 4,804,736 discloses a polyethylene-2,6-naphthalate film suitable for a base film of high-density magnetic recording tapes, having a Young's modulus of not less than 800 Kg/mm² in the machine direction (the longitudinal direction) and of not less than 600 Kg/mm² in the transverse direction, and a surface roughness of not more than 0.008 μm.

However, there is no conception about thermal shrinkage in Japanese Laid-Open Patent Publication No. 88136/1987, and the film disclosed in U.S. Pat. No. 4,804,736 has only a small surface roughness and problems will occur in running properties of the tape.

An object of this invention is to provide a magnetic tape for audio cassettes wherein the above problems are obviated, long-time recording is possible, the stretch and contraction and deformation of the tape due to the tension change at the time of start and stop are small, distortion of recording and output change are small, and tape running properties and audio characteristics (electromagnetic conversion characteristics) are good.

Another object of this invention is to provide a magnetic tape for audio cassettes wherein the characteristics which it has in ordinary environments are not impaired even in use or storage under a high-temperature environment.

The above objects can be accomplished, according to this invention, by a magnetic tape for audio cassettes wherein a magnetic layer is provided on a base film, characterized in that the base film is a biaxially oriented polyethylene-2,6-naphthalate film having a Young's modulus in the longitudinal direction of 850 Kg/mm² or more, a Young's modulus in the transverse direction of 550 Kg/mm² or more, a surface roughness Ra in the range of 0.015 to 0.040 μm, and a thermal shrinkage rate in the longitudinal direction of 0.3% or less in a case where it was held at a temperature of 100° C. for 1 hour.

This invention is more detailedly described below.

FIG. 1 is a graph showing the relation between the Young's modulus in the longitudinal direction and the Young's modulus in the transverse direction of the base film.

In this invention it is necessary that the Young's modulus in the longitudinal direction of the base film is 850 Kg/mm² or more, and thereby it becomes possible to prevent the stretching and contraction or permanent deformation of the tape at the time of electronic editing of the tape or at the time of start and stop, and promptly obviate the distortion of the tape. In case of the Young's modulus in the longitudinal direction being below 850 Kg/mm², stiffness of the base film when formed into a tape decreases and thereby touch with the head for reproduction becomes bad, and further output change becomes large and tone quality becomes bad. From these points, the Young's modulus in the longitudinal direction is preferably 900 Kg/mm² or more, and more preferably 950 Kg/mm² or more.

It is also necessary for the base film to have a Young's modulus in the transverse direction of 550 Kg/mm² or more, and thereby touch thereof with the head for recording and reproduction becomes better. In case the Young's modulus is below 550 Kg/mm², touch thereby with the head becomes bad, and output change becomes large and tone quality becomes bad. From these points, the Young's modulus in the transverse direction is preferably 600 Kg/mm$^2$ or more, and more preferably 650 Kg/mm$^2$ or more. In this connection, it is necessary that the Young's modulus in the longitudinal direction is larger than the Young's modulus in the transverse direction, and when this condition is not satisfied, it becomes easier for the stretching and contraction and deformation of the tape to occur due to tension change at the time of start and stop in tape running. From these points, it is preferred that the Young's modulus in the longitudinal direction is larger than that in the transverse direction by 250 Kg/mm$^2$ or more, and further by 300 Kg/mm$^2$ or more.

Young's moduli in the longitudinal direction and transverse direction can be controlled by the following method.

(1) Longitudinal and transverse successive stretching and heatsetting

For example, a nonstretched film is first longitudinally stretched 4.3 to 6.0-fold at 125° to 170° C., transversely stretched 3.2 to 5.0-fold at 130° to 170° C. and then heatset at 180° to 220° C. for 5 to 30 seconds.

(2) Transverse and longitudinal successive stretching and heatsetting

For example, a nonstretched film is first transversely stretched 3.5 to 5.0-fold at 125° to 150° C., longitudinally stretched 4.5 to 6.5-fold at 130° to 150° C. and then heatset at 180° to 220° C. for 5 to 30 seconds.

(3) Simultaneous stretching and heatsetting

For example, a nonstretched film is first simultaneouly stretched 4.0 to 6.0-fold in the longitudinal direction and 3.2 to 5.0-fold in the transverse direction at 125° to 150° C. and then heatset at 180° to 220° C. for 5 to 30 seconds.

(4) Repeat of stretching and heatsetting

For example, a nonstretched film is longitudinally stretched 1.8 to 3.0-fold at 125° to 170° C., transversely stretched 3.5 to 4.5-fold at 120° to 150° C. and then heatset at 140° to 180° C. for 5 to 10 seconds, and then again longitudinally stretched 2.5 to 3.0-fold at 140° to 200° C. and then heatset at 180° to 220° C. for 5 to 30 seconds. If necessary, the resulting film is further transversely stretched 1.05 to 1.2-fold and then heatset.

It is further necessary that the base film has a thermal shrinkage rate in the longitudinal direction of 0.3% or less when it was held at 100° C. for 1 hour in a noncramped state. This thermal shrinkage rate is preferably 0.15% or less, and more preferably 0.10% or less. When this thermal shrinkage rate goes beyond 0.3 deformation of the tape at the time of use and at the time of storage becomes large and the characteristics of the tape are impaired.

As a method of controlling thermal shrinkage rate there can preferably be adopted a method of thermally treating the film in a state of being rolled in a roll form, or a thermoslackening treatment method. The former is, for example, a method which comprises treating a film rolled in a roll form at a constant temperature and humidity of a temperature of 50° to 80° C. and a relative humidity of 50 to 60% for 3 to 5 days, and the latter is, for example, a method which comprises thermoslackening a tenter-treated film at a temperature of 90° to 130° C. and under a tension of 1.5 to 2.5 Kg/m for 1 to 10 seconds using an air-floated type thermal treatment apparatus.

It is further necessary that the base film in the invention has a surface roughness Ra of 0.015 to 0.040 μm.

When the surface roughness Ra is below 0.015 μm, the running properties of the tape become bad. From this point, the surface roughness Ra is preferably 0.020 μm and particularly preferably 0.025 μm or more. On the other hand, when the surface roughness Ra is above 0.040 μm, its audio characteristics (electromagnetic conversion characteristics) become undesirably bad. From this point, the surface roughness Ra is preferably 0.038 μm or less, and particularly preferably 0.036 μm or less.

A base film in the invention having a surface roughness of 0.015 to 0.040 μm may be one obtained by making a polymer contain inert solid fine particles, i.e. one obtained by depositing fine particles in a polymer preparation step, so-called deposited particles, or one obtained by forming the stated surface roughness according to another surface processing treatment.

Preferred examples of the inert solid fine particles in the invention are (1) silicon dioxide (including hydrates, quartz sand, quartz, etc.), (2) alumina, (3) silicate salts containing 30% by weight or more of $SiO_2$ (for example, amorphous or crystalline clay minerals, alminosilicates (including burned products and hydrates, chrysotile, fly ash, etc.), (4) oxides of Mg, Zn, Zr and Ti, (5) sulfates of Ca and Ba, (6) phosphates of Li, Na and Ca (including monohydrogen salts and dihydrogen salts), (7) benzoates of Li, Na and K, (8) terephthalates of Ca, Ba, Zn and Mn, (9) titanates of Mg, Ca, Ba, Zn, Cd, Pb, Sr, Mn, Fe, Co and Ni, (10) chromates of Ba and Pb, (11) carbon (for example, carbon black, graphite, etc.), (12) glasses (for example, glass powder, glass beads, etc.), (13) carbonates of Ca and Mg, (14) fluorite, and (15) ZnS. More preferred examples are silicic anhydride, water-containing silicic acid, aluminum oxide, aluminum silicate (including burned products, hydrates, etc), monolithium phosphate, trilithium phosphate, sodium phosphate, calcium phosphate, barium sulfate, titanium oxide, lithium benzoate, double salts (including hydrates) of these compounds, glass powder, clay (kaolin, bentonite, china clay, etc), talc, diatom earth, calcium carbonate, etc. Particularly preferred examples are kaolin, silicon dioxide, titanium oxide, calcium carbonate, etc. The average particle size of these inert solid fine particles is preferably 0.1 to 1.8, μm, and more preferably 0.2 to 1.5, μm, and their addition amount is preferably 0.01 to 1.5% by weight (based on polyethylene-2,6-naphthalate), more preferably 0.03 to 1.0% by weight (same as above), and particularly preferably 0.05 to 0.6% by weight (same as above). Further, it is possible to combine two or more inert solid fine particles having different particle sizes and/or being different in kind, or it is also possible to combine them with deposited particles.

In this invention, it is necessary to use polyethylene-2,6-naphthalate to obtain a base film having the aforementioned characteristics.

Polyethylene-2,6-naphthalates in the invention include not only homopolymers but polymers containing polyethylene-2,6-naphthalate by 80% by weight or more. Further, use of polyester compositions is also included in the technique of this invention which comprise copolymers or mixtures containing this as a main component and essentially have the nature of polyethylene-2,6-naphthalate without being impaired.

Further, polyethylene-2,6-naphthalate can contain stabilizers such as phosphoric acid, phosphorous acid and their esters and hindered phenol; antistatic agents; pigments; other various additives, etc.

As methods of obtaining a biaxially oriented film in this invention, there can, for example, be mentioned a so-called longitudinally-transversely successively stretching method comprising longitudinally stretching a nonstretched film and then transversely stretching it, a transversely-longitudinally successively stretching method wherein stretching is carried out in an order contrary thereto, a simultaneous biaxial stretching method, a method wherein these ordinary biaxially stretched films are stretched again, etc., and any of these stretching methods can be adopted. Further, as stretching temperature, stretching percent, etc., conditions satisfying the above characteristics may be adopted from known conditions.

Preferably, the thus obtained base film has a thickness of 3 to 7 μm, and particularly 4 to 6 μm.

The base film in the invention, preferably, has a density of 1.345 to 1.355 g/cm$^3$. When the density is too low, thermal shrinkage rate becomes large and the base film becomes liable to slacken in orientation in heat treatment, etc. at the processing step into tape, and consequently troubles such as lowering of Young's modulus and generation of wrinkles become liable to occur.

Further, when the density is too high, the base film becomes liable to be shaved by the pass rolls or die coater or in the calender treatment step at the processing step into magnetic tape, and white powder is formed and integrated into the magnetic layer to cause of occurrence drop out in the resulting magnetic tape.

The density of the base film can be controlled by controlling the conditions of stretching and thermofixing.

As a method of forming a magnetic layer in the invention, there can be mentioned, although not limited thereto, a method comprising applying a magnetic coating obtained by dispersing powder of a magnetic substance such as γ-Fe$_2$O$_3$, Co-containing γ-Fe$_2$O$_3$, CrO$_2$, Fe—Co, Fe—Co—Ni in a binder comprising polyvinyl chloride, polyvinyl acetate, polyurethane, nitrocellulose or the like, a copolymer or mixture of them or a mixture thereof with another resin. The magnetic substance further includes one obtained by vapor depositing Co, Co—Cr or another ferromagnetic metal according to a vacuum deposition method such as vacuum metallizing, spattering or ion plating.

This invention is further described below by examples. Various physical properties and characteristics in the invention were measured and are defined as follows.

(1) Young's modulus

A film was cut to a sample width of 10 mm and a length of 15 cm, and the sample was pulled by an Instron type tension meter at a distance between the chucks of 100 mm, a pulling rate of 10 mm/minute and a chart speed of 500 mm/minute. Its Young's modulus was calculated from the tangent at the rising part of the resulting load-elongation curve.

(2) Film surface roughness (Ra)

Measured according to JIS B0601. A chart (film surface roughness curve) was drawn under the conditions of a radius of the needle of 2 μm and a load of 0.07 g using a feeler type surface roughness tester (SURFOOM 3B). When the part of a measured length of L in the direction of its center line was extracted from the film surface roughness curve and the center line of the extracted part and the direction of longitudinal stretching percent were designated as an X axis and Y axis, respectively, and the roughness curve was represented by Y=f(x), Ra (μm) given by the following equation is defined as film surface roughness.

$$Ra = \frac{1}{L}\int_O^L |f(x)|dx$$

In this invention, 8 measurements were made using a standard length of 0.25 mm, and Ra was represented as an average value of 5 measurements after 3 measurements having values larger than the others were removed from the 8 measurements.

(3) Thermal shrinkage rate

The base film was cut into strips having a width 10 mm and length of 600 mm, and marks were put on them at an interval of 500 mm. These samples were treated for 1 hour in a hot air circulation type oven of 100° C. without giving any tension, and cooled to room temperature. Thermal shrinkage rate was calculated from change in the size between before and after the thermal treatment. Measurement of the size was made using a minutes size measuring apparatus (Profile Projector Model PJ321F) made by MITSUTOYO Co.

(4) Density

Measured using a density gradient tube containing a mixture of carbon tetrachloride and n-heptane. Measuring temperature was controlled to 25±0.1° C. As a standard of density was used a standard glass float for a density gradient tube produced by Shibayama Kagakukikai Seisakusho Co.

(5) Audio characteristics

Input and output sensitivities and S/N ratio (signal noise) were measured at frequencies of 315 Hz and 10 KHz using a full automatic distortion analyzer Model AA-501 produced by Techtronics Co., compared with the standard tape and evaluated as follows, respectively.

Input and output sensitivity:

⊚Output sensitivity is not lower than input sensitivity.

○Although output sensitivity is somewhat lower than input sensitivity, the former is yet in a good level.

ΔAlthough output sensitivity is lower than input sensitivity, there is no practical problem.

X Output sensitivity is lower than input sensitivity and the tape cannot be used. S/N ratio:

⊚Being in the same level compared to the standard tape for comparison and there is no problem.

○Although the test tape is somewhat inferior to the standard tape for comparison, the former is still in a good level.

ΔAlthough the test tape is inferior to the standard tape for comparison, there is no practical problem.

X The test tape is inferior to the standard tape for comparison, and the former cannot be used.

Moreover, disarray in tone quality at the time of stop and restart of tape running was evaluated as follows.

1 ... Disarray is observed.

2 ... Disarray is somewhat observed, which however does not pose a problem practically.

3 ... Disarray is heavy and the tape is unusable.

(6) Tape running properties

Judged as follows based on observation of a tape running state:

○The tape is stably running even after repeated running (100 times).

ΔAlthough the running state is somewhat unstable after repeated running (100 times), there is no practical problem.

X Tape running is stopped during the repeated running.

(7) Characteristics of tape after storage in a high temperature atmosphere.

Prepared magnetic recording tapes were put in a an audio cassette made of polycarbonate. These tapes were allowed to stand for 24 hours in a hot air circulation type oven maintained at 100° C., taken out and allowed to stand at room temperature for cooling.

The aforementioned input and output sensitivities, S/N ratio and running characteristics were evaluated for these 100° C.-treated tapes. cl EXAMPLE 1, COMPARATIVE EXAMPLE 1

Pellets of polyethylene-2,6-naphthalate of an intrinsic viscosity of 0.65 containing kaolin having an average particle size of 0.86 μm in an amount of 0.25% weight were melt-extruded at 305° C. according to a conventional method to prepare nonstretchliea film. This nonstretched film was longitudinally stretches 6.5-fold at 125° C., successively transversely stretched 3.9-fold at 130° C. and heatest at 220° C. for 5 seconds to obtain biaxially oriented film having a film thickness of 5.0,μm. This film was further thermoslackened (temperature 107° C., tension 2.0 Kg/m) to obtain film whose longitudinal thermal shrinkage rate was 0.1% after leaving at 100° C. for 1 hour (This film is expressed as Example 1).

When the thermoslackening treatment was not carried out, the longitudinal thermal shrinkage rate of the tape after leaving it at 100° C. for 1 hour was 0.4% (This film is expressed as Comparative example 1).

Base films obtained under those conditions were coated with a coating consisting of 70 wt % of γ-$Fe_2O_3$ and 30 wt % of a binder. This binder was obtained by mixing 5 wt % of urethane rubber, 3.5 wt % of nitrocellulose, 1.5 wt % of vinyl chloride, 90 wt % of methyl ethyl ketone and further an isocyanate compound as a curing agent in an amount of 15 wt % based the resin. Magnetic substance-coated raw film having a width of 600 mm was obtained by conventional coating and calender treatment. This coated raw film, was subjected to microslitting treatment using a shear type slitter.

The characteristics of the thus obtained magnetic tapes are shown in Table 1. The tape of Example 1 exhibited no disarray in tone quality at the time of start and stop of the tape, and good audio characteristics of input and output sensitivities and S/N ratio.

EXAMPLES 2 TO 4 AND COMPARATIVE EXAMPLE 2

Biaxially oriented films (thickness 5 μm) having different Young's moduli as shown in Table 1 were obtained by regulating stretching percents in the longitudinal and transverse directions in Example 1. These films were each, slit and rolled up into a roll form (roll width 300 mm, roll length 3000 m). These rolls were allowed to stand for 72 hours in an oven of 80° C. to carry out thermal treatment. These films were given a magnetic layer in the same manner as in Example 1, and characteristics of the resulting tapes were evaluated.

The results are set forth in Table 1. It was revealed that all the tapes of this invention shown in Examples 2, 3 and 4 exhibited excellent characteristics. Further, in case of the tape of Comparative example 2, because of its low longitudinal Young's modulus, disarray in tone quality at the time of start and stop is striking and running properties were also not good.

COMPARATIVE EXAMPLES 3 and 4

Biaxially oriented films having different surface roughnesses were obtained by regulating the addition amount of the inert solid fine particles in Example 1. The film of Comparative example 3 contains 0.1 wt % of added kaolin having an average particle size of 0.86 μm, and the film of Comparative example 4 contains 0.9 wt % of the same added kaolin. These base films were thermally treated in a roll form at a temperature of 80° C. for 72 hours, and then formed into tapes in the same way as in Example 1,and characteristics of the tapes were evaluated.

The results are shown in Table 1. The tape of Comparative example 3 had a too flat film surface and the running characteristics of the tape were extremely bad. Further, the tape of Comparative example 4 had a too rough film surface and its audio characteristics were extremely bad.

As is seen from the foregoing, this invention provides a magnetic tape for audio cassettes which is capable of long-time recording and wherein deterioration of magnetic characteristics does not easily occur in use, storage and the like at a high temperature, for example in the open during summer or in cars, compared to conventional ones.

TABLE 1

| Item | Unit | Ex. 1 | CEx. 1 | Ex. 2 | Ex. 3 | Ex. 4 | CEx. 2 | CEx. 3 | CEx. 4 |
| --- | --- | --- | --- | --- | --- | --- | --- | --- | --- |
| Base film |  |  |  |  |  |  |  |  |  |
| Longitudinal Young's modulus | Kg/mm$^2$ | 1050 | 1070 | 850 | 910 | 1400 | 800 | 1050 | 1060 |
| Transverse Young's modulus | Kg/mm$^2$ | 570 | 580 | 550 | 630 | 550 | 500 | 580 | 580 |
| Thermal shrinkage rate (100° C., 1 hour) | % | 0.10 | 0.40 | 0.20 | 0.23 | 0.25 | 0.15 | 0.15 | 0.15 |
| Surface roughness Ra | μm | 0.036 | 0.036 | 0.035 | 0.036 | 0.033 | 0.035 | 0.012 | 0.045 |
| Density | g/cm$^3$ | 1.351 | 1.351 | 1.350 | 1.351 | 1.351 | 1.351 | 1.351 | 1.350 |
| Tape characteristics |  |  |  |  |  |  |  |  |  |
| Disarray in tone quality at the time of start and stop | — | 1 | 3 | 2 | 1 | 1 | 3 | 1 | 1 |
| Running properties | — | ○ | Δ | ○ | ○ | ○ | ○ | X | Δ |
| Audio characteristics Input and output sensitivites | — | ⊙ | Δ | ⊙ | ⊙ | ⊙ | Δ | ⊙ | X |
| S/N ratio | — | ⊙ | Δ | ⊙ | ⊙ | ⊙ | Δ | ⊙ | X |

Ex. .... Example
CEx. .... Comparative Example

We claim:

1. A magnetic tape for audio cassettes, comprising a magnetic layer provided on a base film, wherein the base film is a biaxially oriented polyethylene-2,6-naphthalate film having a Young's modulus in the longitudinal direction of 850 Kg/mm² or more, a Young's modulus in the transverse direction of 550 Kg/mm² or more, a surface roughness Ra in the range of 0.015 to 0.040 μm, and a thermal shrinkage rate in the longitudinal direction of 0.3% or less in a case where it was held at a temperature of 100° C. for 1 hour, and wherein the difference ($\Delta E = E_M - E_T$) between the Young's modulus ($E_M$) in the longitudinal direction and the Young's modulus ($E_T$) in the transverse direction of the base film is 250 Kg/mm² or more, and the density of the base film is in the range of 1.345 to 1.355 g/cm³.

2. The magnetic tape of claim 1 wherein the Young's modulus in the longitudinal direction of the base film is 900 Kg/mm² or more.

3. The magnetic tape of claim 1 wherein the Young's modulus in the transverse direction of the base film is 600 Kg/mm² or more.

4. The magnetic tape of claim 1 wherein the thermal shrinkage rate in the longitudinal direction of the base film in a case where it was held at 100° C. for 1 hour is 0.15% or less.

5. The magnetic tape of claim 4 wherein the surface roughness Ra of the base film is in the range of 0.020 to 0.038 μm.

6. The magnetic tape of claim 4 wherein the polyethylene-2,6-naphthalate film contains inert solid fine particles having an average particle size of 0.1 to 1.8 μm in an amount of 0.01 to 1.5% by weight.

7. The magnetic tape of claim 1 wherein the base film has a thickness of 3 to 7 microns.

8. The magnetic tape of claim 2 wherein the Young's modulus in the longitudinal direction of the base film is 950 Kg/mm² or more.

9. The magnetic tape of claim 3 wherein the Young's modulus in the transverse direction of the base film is 650 Kg/mm² or more.

10. The magnetic tape of claim 4 wherein the thermal shrinkage rate in the longitudinal direction of the base film in a case where it was held at 100° C. for 1 hour is 0.10% or less.

11. The magnetic tape of claim 9 wherein the surface roughness Ra of the base film is in the range of 0.025 to 0.036 μm.

12. The magnetic tape of claim 6 wherein the inert solid fine particles are selected from the group consisting kaolin, silicon dioxide, titanium oxide, calcium carbonate and a combination of two or more of them.

* * * * *